United States Patent [19]

Krum et al.

[11] Patent Number: 4,908,715
[45] Date of Patent: Mar. 13, 1990

[54] DISK DRIVE UNIT

[75] Inventors: Richard G. Krum, Thousand Oaks; Neil E. Bucknam, Simi Valley, both of Calif.

[73] Assignee: Magnetic Peripherals Inc., Minnetonka, Minn.

[21] Appl. No.: 174,702

[22] Filed: Mar. 29, 1988

[51] Int. Cl.⁴ .............................................. G11B 5/02
[52] U.S. Cl. .................. 360/97.02; 361/392
[58] Field of Search ............ 360/97.01, 98.01; 361/390, 392, 395, 415; 248/568-570

[56] References Cited

U.S. PATENT DOCUMENTS

| | | | |
|---|---|---|---|
| 2,215,743 | 9/1940 | Saurer | 248/569 |
| 4,713,714 | 12/1987 | Gatti | 360/97.01 X |
| 4,754,397 | 6/1988 | Varaiya | 360/97.0 X |
| 4,796,159 | 1/1989 | Miksche | 361/415 X |
| 4,825,316 | 4/1989 | Kishi | 360/97.02 |

OTHER PUBLICATIONS

Tandon Personal Data Pac Portable Winchester Hard Disk-40MB, 1987 (4 pages).

Primary Examiner—A. J. Heinz
Attorney, Agent, or Firm—Kelly, Bauersfeld & Lowry

[57] ABSTRACT

An improved disk drive unit is provided for use in microcomputers such as personal computers and the like. The disk drive unit includes a substantially sealed disk drive housing and related circuit board with drive electronics carries by a common rigid chassis. A power connector plug is securely mounted onto the chassis at a rear margin thereof and cooperates with one or more interface connectors to permit simple slide fit installation of the disk drive unit into a computer system cabinet, such as a central processor unit for a computer. In addition, the disk drive unit includes improved shock mounts for supporting the sealed disk drive housing from the rigid chassis. The disk drive unit further includes a floating bushing arrangement for interconnecting the circuit board to the disk drive housing in a manner substantially isolating thermal expansion characteristics of the circuit board from the remainder of the disk drive unit.

12 Claims, 4 Drawing Sheets

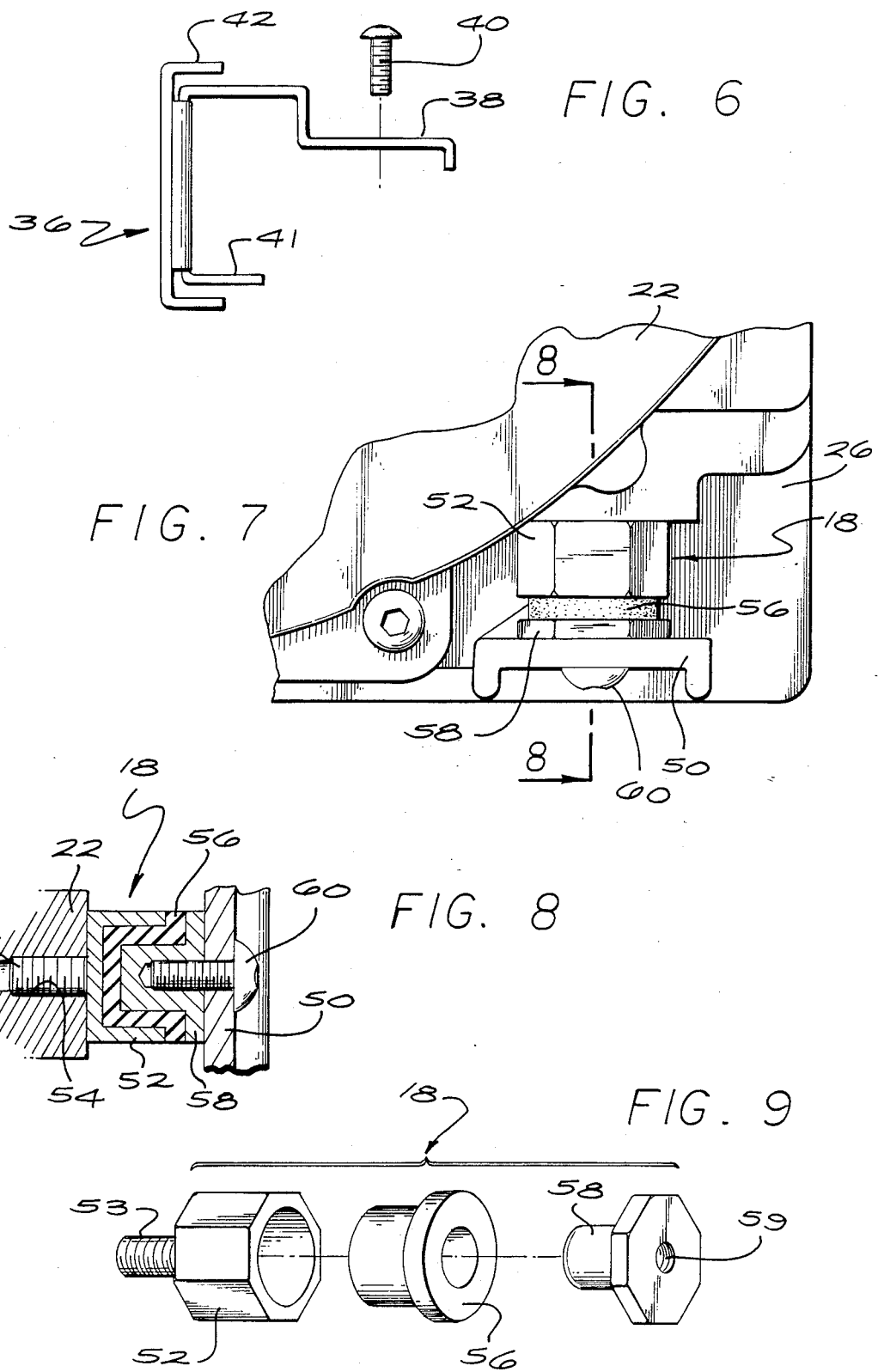

DISK DRIVE UNIT

BACKGROUND OF THE INVENTION

This invention relates generally to improvements in disk drive units of the general type used in modern microcomputers such as personal computers and the like. More particularly, this invention relates to an improved mechanical mounting configuration for a power connector plug in a disk drive unit. In addition, this invention relates to improvements in shock mounts for isolating portions of the disk drive unit from undesired shock and vibration, and to improvements in thermal isolation of the circuit board carrying the drive electronics from other portions of the disk drive unit.

Disk drive units in general are known in the art for use in modern microcomputers such as personal and desk top computers and the like. In one popular form, such disk drive units comprise a so-called Winchester disk drive having one or more rotatably driven memory storage disks mounted within a substantially sealed disk drive housing along with one or more related electromagnetic heads for reading and writing data on appropriately prepared disk surfaces. A disk drive unit of this type, sometimes referred to as a "fixed" disk, is normally available as a compact package with the sealed housing mounted onto a rigid frame or chassis together with a circuit board carrying the necessary drive electronics for interfacing with other components of a computer system. In this regard, the disk drive unit requires a power connector plug for supplying electrical power to the drive electronics as well as to a suitable drive motor for rotating the disks. In addition, the disk drive unit requires one or more interface connectors for coupling the drive electronics to the computer system, such as a main system controller which supplies appropriate commands to the disk drive unit for reading and/or writing data.

In the past, installation of a fixed disk drive unit into a modern microcomputer has been a relatively difficult task. More particularly, in a typical installation, it has been necessary to open the cabinet of the computer such as the housing of a main central processor unit to permit installation of the disk drive unit The installation procedure has required careful and proper placement of the disk drive unit, together with correct coupling of the power connector plug and interface connector with mating fittings located within the processor unit housing. To avoid errors in installation and potential damage to fragile computer components, many individuals have preferred that the disk drive installation task be performed by a skilled technician.

In addition, disk drive units for modern microcomputers commonly include resilient shock mounts for supporting the sealed disk drive housing from the rigid chassis. Such shock mounts are intended to isolate the disks and associated heads from undesired shocks or vibrations which could otherwise cause tracking errors in the course of reading and writing data. In the past, disk drive shock mounts have included a resilient buffer member secured by an adhesive or the like between support blocks which are fastened in turn typically with screws to facing surfaces of the disk drive housing and the chassis. However, these shock mounts are difficult to construct and install without applying a torque to the resilient buffer member, wherein such torque frequently causes the adhesive connection of the buffer member to fail.

Still further, in currently available disk drive units, problems have been encountered with respect to differential thermal expansion of the disk drive housing and the related circuit board during normal operation. That is, the sealed disk drive housing and the circuit board are constructed from different materials which experience different thermal growth when subjected to variations in temperature during normal operation of the disk drive unit. The circuit board is particularly subject to complex thermal growth characteristics due in part to localized hot spots attributable to heating of electronic components carried thereon. It is necessary to isolate the thermal size changes of the circuit board from the disk drive housing to prevent the imposition of structural stresses upon the housing, since such stresses potentially can cause minor shift between the heads and the related memory storage disks to result in read and-/or write errors.

There exists, therefore, a significant need for improvements in fixed disk drive units for computers, particularly with respect to simplifying disk drive unit installation into a central processor unit or the like of a computer system. Moreover, there exists a need for improvements in disk drive shock mounts, and in circuit board mounting arrangements for thermally isolating the board from remaining components of the disk drive unit. The present invention fulfills these needs and provides further related advantages.

SUMMARY OF THE INVENTION

In accordance with the invention, an improved disk drive unit is provided for use in a microcomputer particularly such as a personal or desk top computer or the like. The improved disk drive unit is designed for relatively simple slide fit installation into a computer system from the front of a system cabinet, such as the cabinet of a main central processor unit or the like, without requiring the system housing to be opened or directly accessed. In addition, the improved disk drive unit includes improved shock mounts adapted for simplified assembly and installation. The disk drive unit further includes a relatively simple floating bushing arrangement for isolating thermal shift of a circuit board from other portions of the disk drive unit.

The disk drive unit conventionally includes one or more rotatably driven memory storage disks mounted within a substantially sealed disk drive housing in operative relation with an appropriate head or heads for reading and writing data. The disk drive housing is supported by a plurality of shock mounts by a relatively rigid frame or chassis. A circuit board carrying the necessary drive electronics for the disk drive unit is also carried by the chassis, typically by mounting the board at the underside of the disk drive housing. A power connector plug and at least one interface connector are provided for connection with mating fittings provided with the computer system, all in a manner generally known in the art.

In accordance with one major aspect of the invention, the power connector plug is supported on the chassis by a support bracket at a rear margin of the disk drive unit in a rearwardly facing position oriented in parallel with a fore-aft axis of the unit. The support bracket orients the plug in a position seated against a rigid backstop surface such as a land on the disk drive housing, whereby the power connector plug can be engaged with a mating fitting during disk drive installation by rearward sliding of the disk drive unit into a forwardly slot in the computer system cabinet, with the backstop surface providing a rigid base to force the plug into fitting engagement. An interface connector is also located at the rear margin of the disk drive unit in a similar rearward facing orientation for similar slide fit engagement with a mating interface fitting Accordingly, both the power connector plug and the interface connector are appropriately engaged with their respective fittings upon slide fit installation of the disk drive unit into the system cabinet.

The improved shock mounts are provided typically at each of four corners of the disk drive housing for supporting the housing from the rigid chassis. Each shock mount comprises a generally cup-shaped resilient buffer member interposed between outer and inner cup blocks adapted for mounting respectively to the disk drive housing and the chassis. This interfitting cup geometry beneficially provides the resilient buffer member between the components to isolate the disk drive housing from shocks and vibrations, without requiring bonding of the buffer member to any component. Moreover, the components of the assembled shock mount may be rotated relative to each other during installation without risk of shock mount failure.

In accordance with a further aspect of the invention, the circuit board is supported by the disk drive housing by a plurality of mounting screws passed through appropriately located holes formed in the circuit board. At least some of these circuit board holes are oversized and lined with a spacer bushing adapted to float relative to the circuit board. These spacer bushings thus permit circuit board thermal expansion and contraction within its own plane independent of the disk drive housing or chassis, thereby isolating the thermal shift characteristics of the circuit board from the disk drive housing.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a rear elevation view taken generally on the line 6—6 of FIG. 5;

FIG. 7 is an enlarged fragmented top plan view illustrating an improved shock mount, taken generally on the line 7—7 of FIG. 1;

FIG. 8 is a fragmented vertical sectional view taken generally on the line 8—8 of FIG. 7;

FIG. 9 is an exploded perspective illustrating assembly of components forming the improved shock mount;

DETAILED DESCRIPTION OF THE PREFERRED EMBODIMENT

Figure 1:
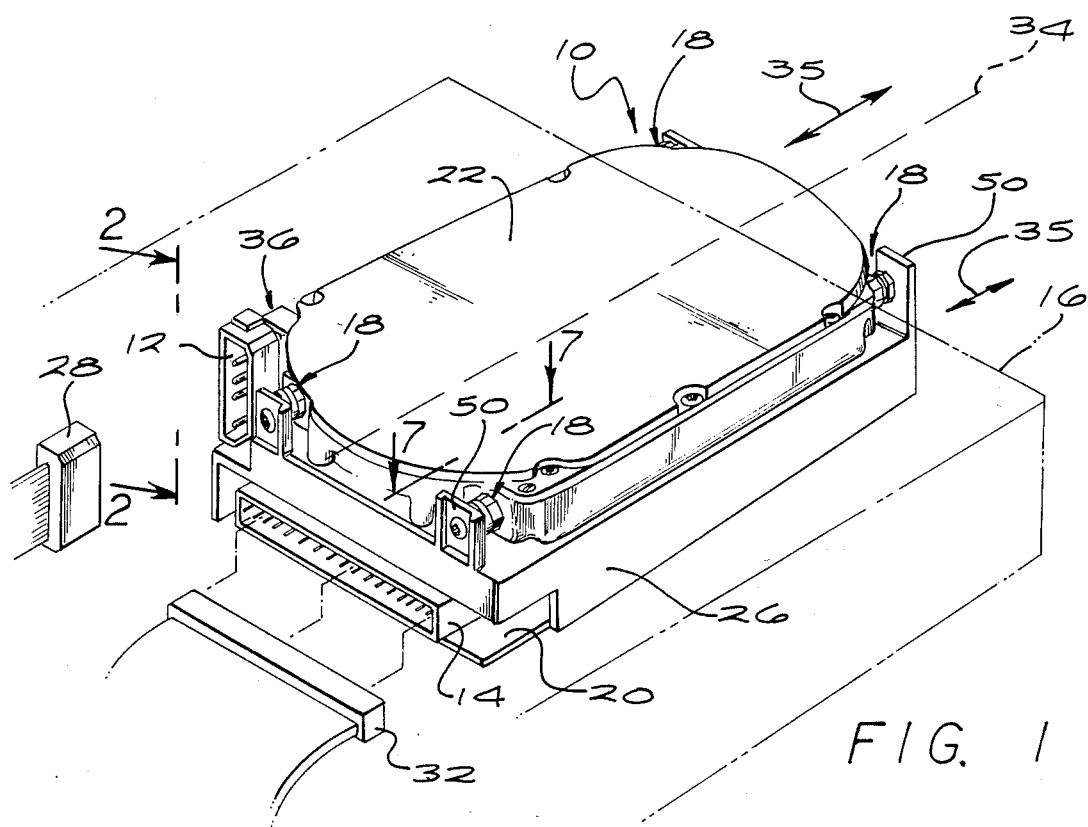
FIG. 1 is a perspective view illustrating a disk drive unit embodying the novel features of the invention.

As shown in the exemplary drawings, an improved disk drive unit referred to generally by the reference numeral 10 is provided for use in a computer system, such as in a modern microcomputer or the like. The disk drive unit 10 includes an improved mounting arrangement for a power connector plug 12 in association with a related interface connector 14 to permit simple slide fit installation of the disk drive unit 10 into an appropriate cabinet 16, shown in dotted lines in FIG. 1, of a computer system. In addition, the disk drive unit 10 includes an improved shock mount 18 adapted for facilitated assembly and installation. The disk drive unit also includes an improved mounting arrangement for a circuit board 20 in a manner isolating thermal shift of the circuit board from a disk drive housing 22.

In general terms, the disk drive unit 10 of the present invention comprises a Winchester or "fixed" disk drive of the type known for use in modern microcomputers, such as personal and desk top computers and like. More specifically, the disk drive unit 10 includes the substantially sealed disk drive housing 22 within which is mounted one or more memory storage disks. These disks are rotatably driven by a small spindle motor in operative relation with associated electromagnetic heads for reading and writing of data on the surfaces of the disks. The disk drive housing 22 is carried by a relatively rigid frame or chassis 26, with the resultant package in turn supporting the circuit board 20 which carries the necessary drive electronics. The power connector plug 12 is adapted for coupling to a mating power fitting 28, and at least one interface connector 14 on the circuit board 20 is adapted for coupling to a mating interface fitting 32. Both the power and interface fittings 28 and 32 are provided within the cabinet 16 of the computer system, such as within the main central processor unit of the computer system. As in known in the art, the power connector plug 12 couples electrical power to the spindle motor and disk drive electronics, whereas the interface connector 14 couples the drive electronics to the computer system for operation of the disk drive unit as a component thereof. Importantly, the described components within the sealed disk drive housing may assume any construction known in the art, with a preferred construction being shown and described in copending application Ser. No. 07/173,613, filed Mar. 25, 1988, and entitled DISK DRIVE SPINDLE MOTOR, which is incorporated by reference herein.

As shown in detail in FIGS. 1-6, the power connector plug 12 and the interface connector 14 are mounted on a rear margin of disk drive unit 10. More particularly, the interface connector 14 may be provided in one of several known standard types available in the computer industry, such as those interface connectors referred to as ST-506, SCSI, or ESDI, with the particular type selected being normally dependent upon computer system design performance. Moreover, in some designs, more that one interface connector 14 will be required.

Figure 2:
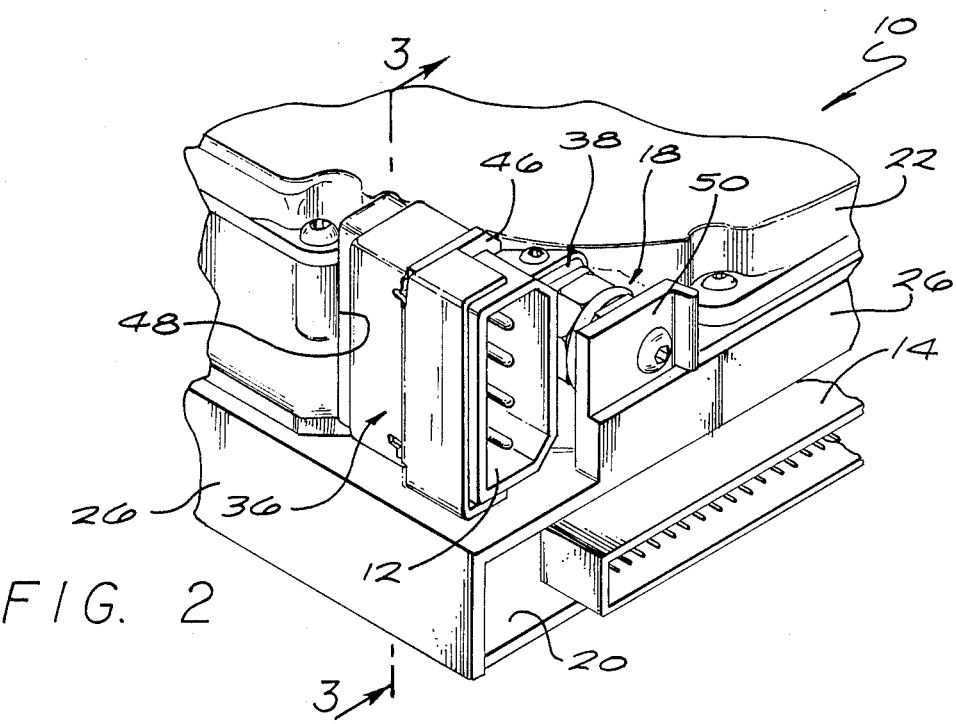
FIG. 2 is an enlarged fragmented perspective view illustrating a power connector plug mounting arrangement for the disk drive unit.
Figure 3:
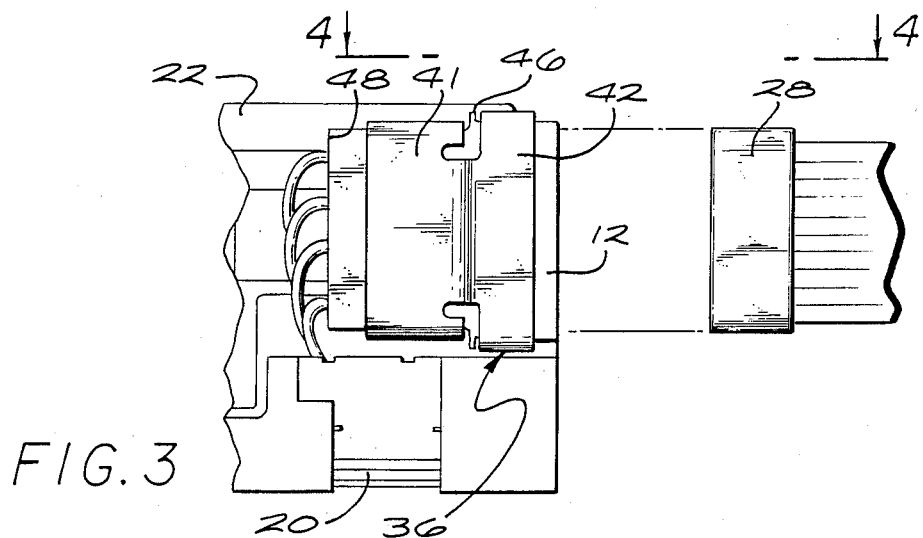
FIG. 3 is a fragmented and partially exploded side elevation view of a portion of the disk drive unit, taken generally on the line 3—3 of FIG. 2.
Figure 4:
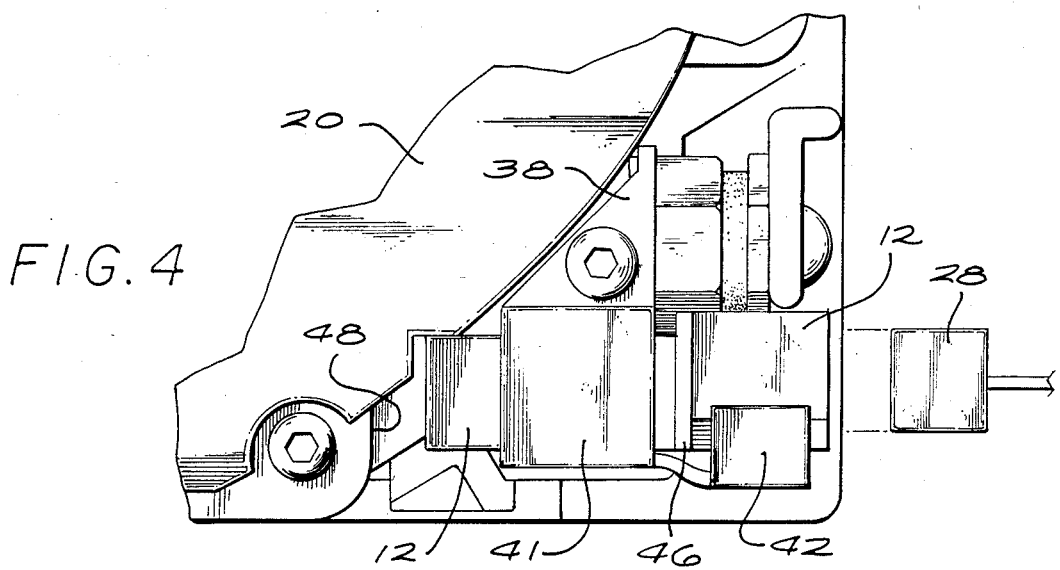
FIG. 4 is a fragmented and partially exploded top plan view taken generally on the line 4—4 of FIG. 3.
Figure 5:
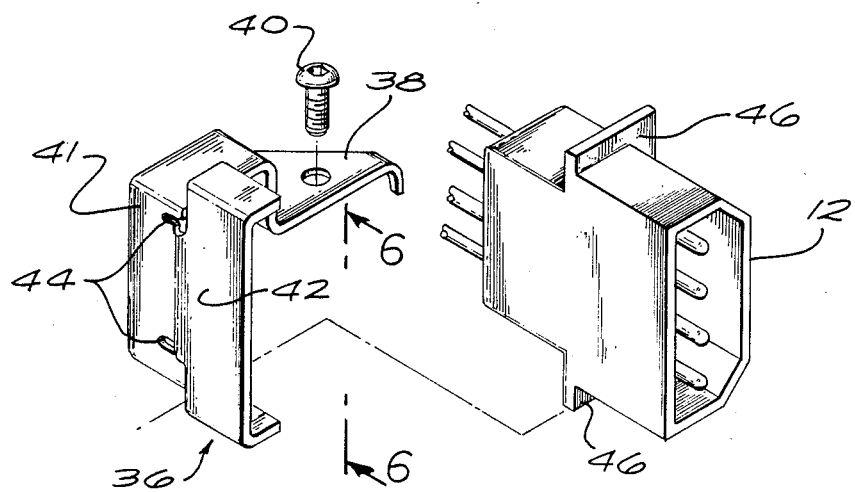
FIG. 5 is an exploded perspective view illustrating further construction details of the power connector plug mounting arrangement.

As shown best in FIGS. 1 and 2, the interface connector 14 is conventionally mounted at the rear margin of the circuit board 20 in a rearward facing position. In this orientation, the interface connector 14 is adapted for sliding movement along a fore-aft axis 34 in the direction of arrows 35 (FIG. 1) for coupling with the mating interface fitting 32 within the computer system cabinet 16. A key 24 (FIG. 10) may be provided on the underside of the interface connector 14 for registry with a notch 25 at the rear margin of the circuit board 20, thereby insuring proper alignment of the connector 14 on the board.

The power connector plug 12 is also mounted at the rear margin of the disk drive unit 10 in a rearward facing position. However, as viewed in FIGS. 1 and 2, the power connector plug 12 is positioned out of the plane of the interface connector 14, thereby permitting the interface connector 14 to occupy substantially the entire width of the disk drive unit. Moreover, the power connector plug 12 is securely anchored to the L rigid chassis 26 in an orientation for sliding coupling with the mating power fitting 28 when the disk drive unit in slidably moved along the fore-aft axis 34. Accordingly, when the power and interface fittings 28 and 32 are fixedly mounted within the cabinet 16 in forward facing orientations, the entire disk drive unit 10 can be installed quickly and easily from the front of the cabinet 16 by simple sliding of the disk drive unit through an appropriate slot in the cabinet into coupled relation with the fittings 28 and 32. Opening of the cabinet 16 for disk drive installation purposes is thus avoided.

A support bracket 36 is provided to mount the power connector plug 12 in a secure manner capable of withstanding the typically substantial reaction forces created as the plug 12 is engaged with the power fitting 28. More particularly, with reference to FIGS. 2–6, the support bracket 36 includes a side wing 38 adapted for simple securement to the disk drive housing 22 by means of a screw 40 or the like. The side wing 40 is joined to a pair of upstanding bracket plates 41 and 42 separated from each other by upper and lower slots 44. Upper and lower tabs 46 on the typically plastic molded connector plug 12 are received through these slots 44, whereby forwardly directed forces created by engagement of the plug 12 with the fitting 28 are transferred through the plug 12 and its tabs 46 to the bracket plate 41. In the event the bracket plate 41 is nevertheless deflected forwardly by these reaction forces, a rearwardly presented backstop surface 48 defined by a forwardly relieved portion of the disk drive housing 22 provides positive structural support for the plug 12. Importantly, the forces of engagement of the power connector plug 12 are, with this arrangement, isolated from the relatively fragile circuit board 20.

In accordance with another aspect of the invention, a plurality of the improved shock mounts 18 are provided for resiliently supporting the disk drive housing relative to the rigid chassis 26. In the preferred form, four of these shock mounts 18 are provided respectively at each of the four corners of the disk drive housing (FIG. 1) for supporting the housing 22 with respect to adjacent upstanding support plates 50 on the chassis 26. These improved shock mounts 18 are designed to have a simplified construction for facilitated assembly and ease of mounting of the disk drive housing.

More particularly, as viewed in more detail in FIGS. 7–9, each shock mount 18 comprises an outer cup block 52 formed from a suitable rigid material such as metal and defining an open-ended cup having a noncircular exterior geometry such as a hexagonal shape for engagement with a wrench. A threaded shaft 53 projects coaxially from the closed end of the cup for threaded connection into a suitable bore 54 (FIG. 8) in the disk drive housing. A resilient, cup-shaped buffer member 56 is sized and shaped to nest within the outer cup block 52. An inner cup block 58 is sized and shaped for nesting in turn within the buffer member 56, wherein the inner block 58 includes an outwardly presented bore 59 for threaded reception of a screw 60 or the like provided to fasten the inner block to the adjacent chassis support plate 50. With this construction, the use of adhesive material for joining structures to the buffer member is avoided, and the shock mount components may be rotated relative to each other, such as during normal installation of the disk drive housing, without concern for the shock mount 18 becoming disassembled. Any suitable buffer member material may be used, such as Delrin, to provide the selected cushion characteristics for isolating the disk drive housing from external shocks and vibrations.

Figure 10:
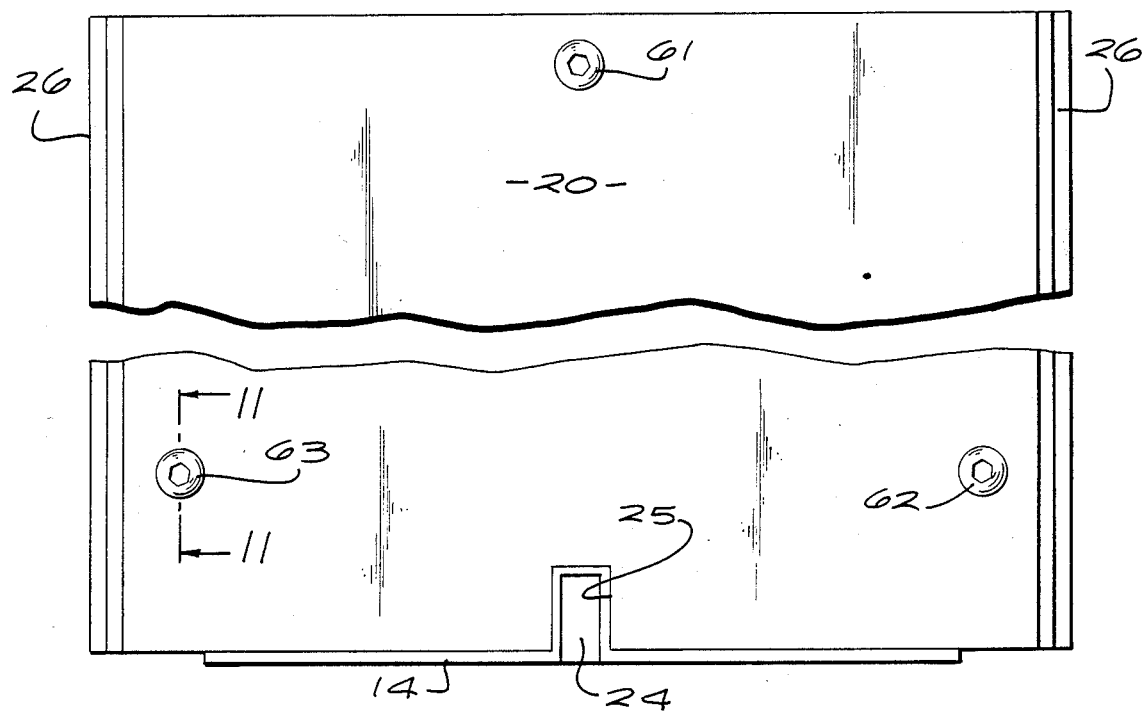
FIG. 10 is a fragmented bottom plan view of the disk drive unit.
Figure 11:
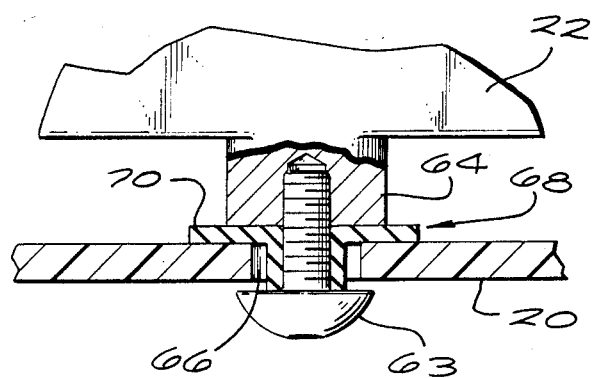
FIG. 11 is an enlarged fragmented vertical sectional view illustrating a floating spacer bushing, taken generally on the line 11—11 of FIG. 10.
Figure 12:
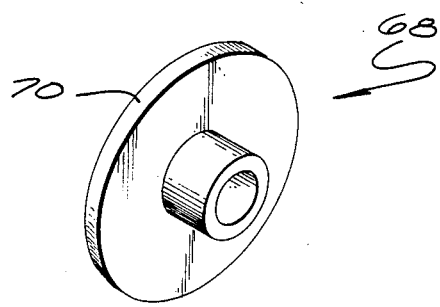
FIG. 12 is a perspective view illustrating the floating spacer bushing.

FIGS. 10–12 depict still another feature of the invention wherein the circuit board 20 is mounted to the underside of the disk drive housing 22 in a manner isolating the disk drive housing from thermal shift encountered by the circuit board 20 during normal disk drive unit operation. More specifically, as viewed in FIG. 10, a plurality of mounting screws are provided for fastening the circuit board to the disk drive housing, with three screws 61, 62 and 63 being shown by way of example. At least some of these mounting screws are fastened into threaded bosses 64 formed in the disk drive housing 22 by passage through slightly oversize ports 66 (FIG. 11) in the circuit board. Each of these oversize ports 66 is lined with a spaced bushing 68 adapted to undergo at least some positional floating in the plane of the circuit board 20 as the circuit board experiences thermal growth and contraction due to component heating during normal disk drive operation. As shown best in FIG. 11, each spacer bushing 68 includes a radially enlarged upper flange 70 interposed between the lower end of the boss 64 and the upper face of the circuit board. In addition, the lower axial face of the spacer bushing 68 projects slightly beyond the underside face of the board such that the head of the screw 63 bears upon the bushing and not upon the relatively fragile board. Accordingly, while the mounting screws prevent separation of the circuit board from the disk drive housing, the oversize ports 66 and spacer bushings 68 permit the board to undergo sufficient float in its plane to avoid transferring thermal shift stresses to the disk drive housing.

In the preferred form of the invention, the mounting screw 61 at the front margin of the circuit board (FIG. 10) is secured without float capability to positively anchor the circuit board. However, the other two mounting screws 62 and 63 mounted to the board near opposite side margins and close to the rear margin are passed through the oversize ports 66 and associated spacer bushings 68 which thus accommodate longitudinal thermal shift of the circuit board.

A variety of modifications and improvements to the improved disk drive unit of the present will be apparent to those skilled in the art. Accordingly, no limitation on the invention is intended by way of the foregoing description or the accompanying drawings, except as set forth in the appended claims.

What is claimed is:

1. A disk drive unit, comprising:
   a disk drive housing;
   a circuit board carrying drive electronics;
   a relatively rigid chassis for supporting said disk drive housing and said circuit board, said chassis having front and rear ends;
   an interface connector mounted generally at said rear end of said chassis;
   a power connector plug; and
   a mounting bracket secured into said chassis and including means for securely mounting said power connector plug onto said chassis generally at said chassis rear end, said interface connector and said power connector plug being oriented on said chassis so that the disk drive unit can be slidably displaced in a rearward direction for slide fit coupling of said interface connector and said power connector plug with mating fittings of a computer system;
   said power connector plug including at least one outwardly projecting tab, and wherein said mounting bracket is shaped for seated reception of said power connector plug and has a slot formed therein for receiving said tab when said plug is seated within said mounting bracket.

2. The disk drive unit of claim 1 wherein said circuit board has a generally planar shape, and further wherein said power connector plug is supported by said mounting means at a position out of the plane of said circuit board.

3. The disk drive unit of claim 1 further including a plurality of shock mounts for resiliently supporting said disk drive housing from said chassis, each of said shock mounts comprising outer add inner generally cup-shaped blocks for mounting respectively to said disk drive housing and said chassis, and a resilient cup-shaped buffer member nested between said outer and inner blocks and supported therebetween by nested reception of said buffer member into said outer block and by nested reception of said inner block into said buffer member.

4. The disk drive unit of claim 1 wherein said power connector plug has a front end and a rear end, and further wherein said disk drive housing includes a backstop support surface disposed adjacent to said front end of said power connector plug for structurally supporting said plug.

5. The disk drive unit of claim 1 wherein said interface connector is mounted onto a rear margin of said circuit board.

6. The disk drive unit of claim 5 wherein said interface connector has a key thereon for mating reception into a mating notch formed in the rear margin of said circuit board.

7. A disk drive unit, comprising:
   a disk drive housing;
   a circuit board carrying drive electronics;
   a relatively rigid chassis for supporting said disk drive housing and said circuit board, said chassis having front and rear ends;
   an interface connector mounted generally at said rear end of said chassis;
   a power connector plug;
   means for securely mounting said power connector plug onto said chassis generally at said chassis rear end, said interface connector and said power plug being oriented on said chassis so that the disk drive unit can be slidably displaced in a rearward direction for slide fit coupling of said interface connector and said power connector plug with mating fittings of a computer system; and
   further including means for mounting said circuit board to said disk drive housing, said circuit board mounting means including a plurality of mounting screws passed through ports formed in said circuit board and fastened into bosses on said disk drive housing, at least some of said circuit board ports being oversized to permit at least some freedom of movement permitting the circuit board to float in its own plane relative to said housing to accommodate thermal size shift during normal disk drive unit operation.

8. The disk drive unit of claim 7 further including spacer bushings lining said oversized circuit board ports, and further wherein each of said spacer bushings includes a radially enlarged flange at one end thereof interposed between the end of the associated boss on the disk drive housing and the circuit board, and an opposite axial end projecting through and at least slightly beyond the circuit board port.

9. A disk drive unit in combination with a computer system cabinet having a forwardly open slot therein for slide-in reception of the disk drive unit, and a power fitting and an interface fitting securely mounted generally at the rear of said cabinet slot in forward facing orientations, said disk drive unit comprising:
   a relatively rigid chassis having front and rear ends;
   a disk drive housing;
   a circuit board having drive electronics thereon;
   means for supporting said disk drive housing and said circuit board from said chassis to define a generally compact package having an overall size and shape for sliding fit into said cabinet slot;
   an interface connector secured generally at a rear margin of said package in a position for mating coupling with said interface fitting when said package is slidably inserted into said cabinet slot;
   a power connector plug; and
   a mounting bracket secured onto said chassis and including means for mounting said power connector plug generally at a rear margin of said package in a position for mating coupling with said power fitting when said package is slidably inserted into said cabinet slot;
   said power connector plug including at least one outwardly projecting tab, and wherein said mounting bracket is shaped for seated reception of said power connector plug and has a slot formed therein for receiving said tab when said plug is seated within said mounting bracket.

10. The combination of claim 9 wherein said power connector plug has a front end and a rear end, and further wherein said disk drive housing including a backstop support surface disposed adjacent to said front end of said power connector plug for structurally supporting said plug.

11. The combination of claim 9 wherein said interface connector is mounted onto a rear margin of said circuit board.

12. The combination of claim 9 wherein said circuit board has a generally planar shape, and further wherein said power connector plug is supported by said plug mounting means at a position out of the plane of said circuit board.

* * * * *